(12) United States Patent
Lopez, Jr. et al.

(10) Patent No.: US 9,868,133 B1
(45) Date of Patent: Jan. 16, 2018

(54) MASKING DEVICE

(71) Applicant: Engineered Products and Services, Inc., Franksville, WI (US)

(72) Inventors: Mario Lopez, Jr., Mt. Pleasant, WI (US); Chad M. Cushman, Racine, WI (US); Kissak Sarajian, Hartland, WI (US)

(73) Assignee: Engineered Products and Services, Inc., Franksville, WI (US)

( * ) Notice: Subject to any disclaimer, the term of this patent is extended or adjusted under 35 U.S.C. 154(b) by 0 days.

(21) Appl. No.: 15/337,449

(22) Filed: Oct. 28, 2016

(51) Int. Cl.
| | | |
|---|---|---|
| B32B 37/10 | (2006.01) | |
| B05C 21/00 | (2006.01) | |
| C09J 183/04 | (2006.01) | |

(52) U.S. Cl.
CPC .......... B05C 21/005 (2013.01); C09J 183/04 (2013.01)

(58) Field of Classification Search
CPC .......... Y10T 428/24174; B05C 21/005; B05B 15/0456; B05B 15/045; B32B 12/10; B32B 12/12; B32B 2037/1246
USPC ...................................................... 156/60
See application file for complete search history.

(56) References Cited

U.S. PATENT DOCUMENTS

| | | |
|---|---|---|
| 3,386,846 A | 6/1968 | Lones |
| 4,454,180 A | 6/1984 | La Mers |
| 4,550,683 A | 11/1985 | Jones |
| 4,787,158 A | 11/1988 | Vitol |
| 5,037,501 A | 8/1991 | Lawson |
| 5,098,786 A | 3/1992 | Hanke |
| 5,441,769 A | 8/1995 | Ross |
| 5,464,692 A | 11/1995 | Huber |
| 5,468,538 A | 11/1995 | Nameche |
| 5,514,442 A | 5/1996 | Galda et al. |
| 5,618,600 A | 4/1997 | Denklau |
| 5,631,055 A | 5/1997 | Vines et al. |
| 5,654,055 A | 8/1997 | Cox et al. |
| 5,776,572 A | 7/1998 | Lipson |
| 5,800,894 A | 9/1998 | Navis |
| 6,656,558 B1 | 12/2003 | Sarajian |
| 8,877,311 B1 | 11/2014 | Avila et al. |

FOREIGN PATENT DOCUMENTS

| | | |
|---|---|---|
| CA | 2075631 | 11/1992 |
| EP | 3506915 | 7/1992 |
| WO | 9206794 | 4/1992 |
| WO | 9216367 | 10/1992 |

*Primary Examiner* — Alexander Thomas
(74) *Attorney, Agent, or Firm* — Michael Best & Friedrich LLP

(57) ABSTRACT

A masking device for covering a masking area. The masking device includes a first member, a second member, and a third member. The masking device further includes a base formed by the first member, the second member, and the third member. The base defines a top surface and a bottom surface. The masking device further includes a pull tab formed by the first member and the second member. The pull tab extends away from the top surface of the base. The bottom surface includes an adhesive. The bottom surface is configured for removable attachment to the masking area.

6 Claims, 8 Drawing Sheets

MASKING DEVICE

BACKGROUND

The present invention relates to masking devices, and more particularly, to masking devices having pull tabs extending upwardly therefrom to facilitate easy removal of the masking devices from a masking area.

Masking is often used in tandem with the painting or coating of parts used in the automotive, aerospace, electronics and other industries. The painting or coating of parts may involve liquid coating, plating, powder coating or electroplating. The coating may be applied by a variety of methods including brushing, rolling, spraying, dipping, flow-coating, electro-static coating, and submersion in deposition tanks. The liquid, powder or plating material may be applied to wood, fiberglass, or metal surfaces in order to protect and strengthen those surfaces. The coating protects the surface of a part by preventing electrical leakage, oxidation, corrosion and decay. The cured coating forms a very strong protective layer on the surface that is highly resistant to scratching and chipping.

In most applications, a protective coating is applied to only specific areas of a surface. The areas which will not receive the coating must be covered or masked off. Typically, a paper or polyester film element in the form of masking tape is applied to the surface areas to be masked. The masking tape generally has an adhesive on one side so that it may be affixed to the surface to be masked. Once the painting or coating process has been completed, the masking tape is removed from the surface.

SUMMARY

In one aspect, the invention provides a masking device for covering a masking area. The masking device includes a first member, a second member, and a third member. The masking device further includes a base formed by the first member, the second member, and the third member. The base defines a top surface and a bottom surface. The masking device further includes a pull tab formed by the first member and the second member. The pull tab extends away from the top surface of the base. The bottom surface includes an adhesive. The bottom surface is configured for removable attachment to the masking area.

In another aspect, the invention provides a method of manufacturing a masking device used for covering a masking area. The method includes conveying a first tape along an assembly line toward a press roller, conveying a second tape along the assembly line toward the press roller, conveying a third tape along the assembly line toward the press roller, and curling lateral edges of the second tape toward each other such that the second tape is tubular-shaped. The method further includes converging the first tape, the second tape, and the third tape through the press roller to couple the first tape, the second tape, and the third tape together. The method further includes cutting through the first tape, the second tape, and the third tape via a die cutter to cut out the masking device. The method further includes applying the masking device to a release liner in a manner that the masking device is removable from the release liner.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
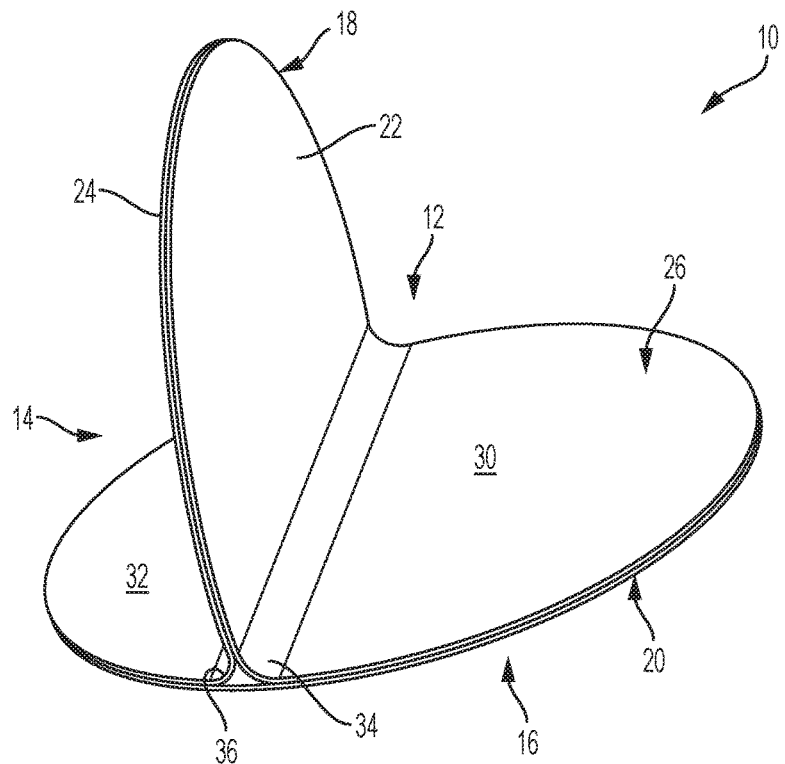
FIG. 1 is a top perspective view of a masking device in accordance with the present invention.
Figure 2:
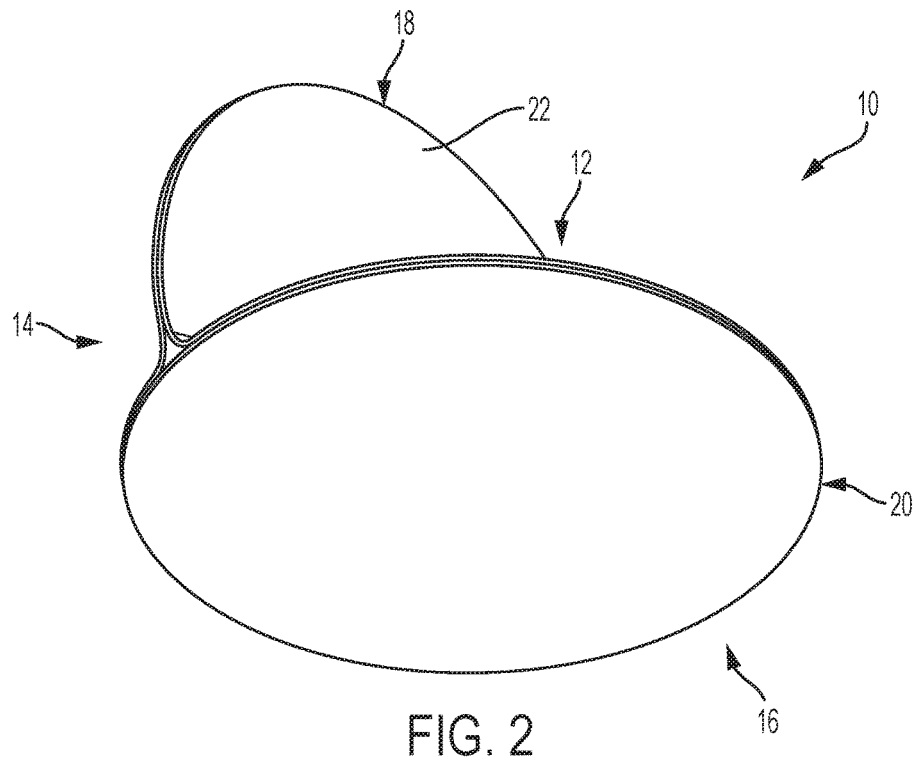
FIG. 2 is a bottom perspective view of the masking device of FIG. 1.

FIGS. 1 and 2 illustrate a masking device 10 composed of three separate members—a first member 12, a second member 14, and a third member 16—that together form various aspects of the masking device 10. For example, the masking device 10 includes a pull tab 18 and a base 20. The pull tab 18 is formed by a first portion 22 of the first member 12 and a first portion 24 of the second member 14. The base 20 is formed by a second portion 30 of the first member 12, a second portion 32 of the second member 14, and the entirety of the third member 16. The three members 12, 14, 16 are coupled together via an adhesive to maintain the shape of the masking device 10. In the illustrated embodiment, the masking device 10 is composed of a polymer material (e.g., polyester), while in other embodiments, the masking device 10 may alternatively be composed of other materials, such as paper, cardboard, plastic etc.

With continued reference to FIGS. 1 and 2, the pull tab 18 extends upwardly from the base 20 of the masking device 10. The first portion 22 of the first member 12 and the first portion 24 of the second member 14 together define a gripping area to allow a user to grasp and maneuver the masking device 10. The base 20 includes a top surface 26 and a bottom surface 28 opposite the top surface 26. The bottom surface 28 is completely flat and is provided with an adhesive in order to maintain contact with a masking area when the masking device 10 is applied to the masking area. The top surface 26 of the base 20 includes the second portion 30 of the first member 12 and the second portion 32 of the second member 14. The pull tab 18 is disposed at the intersection of the two portions 30, 32.

Figure 3:
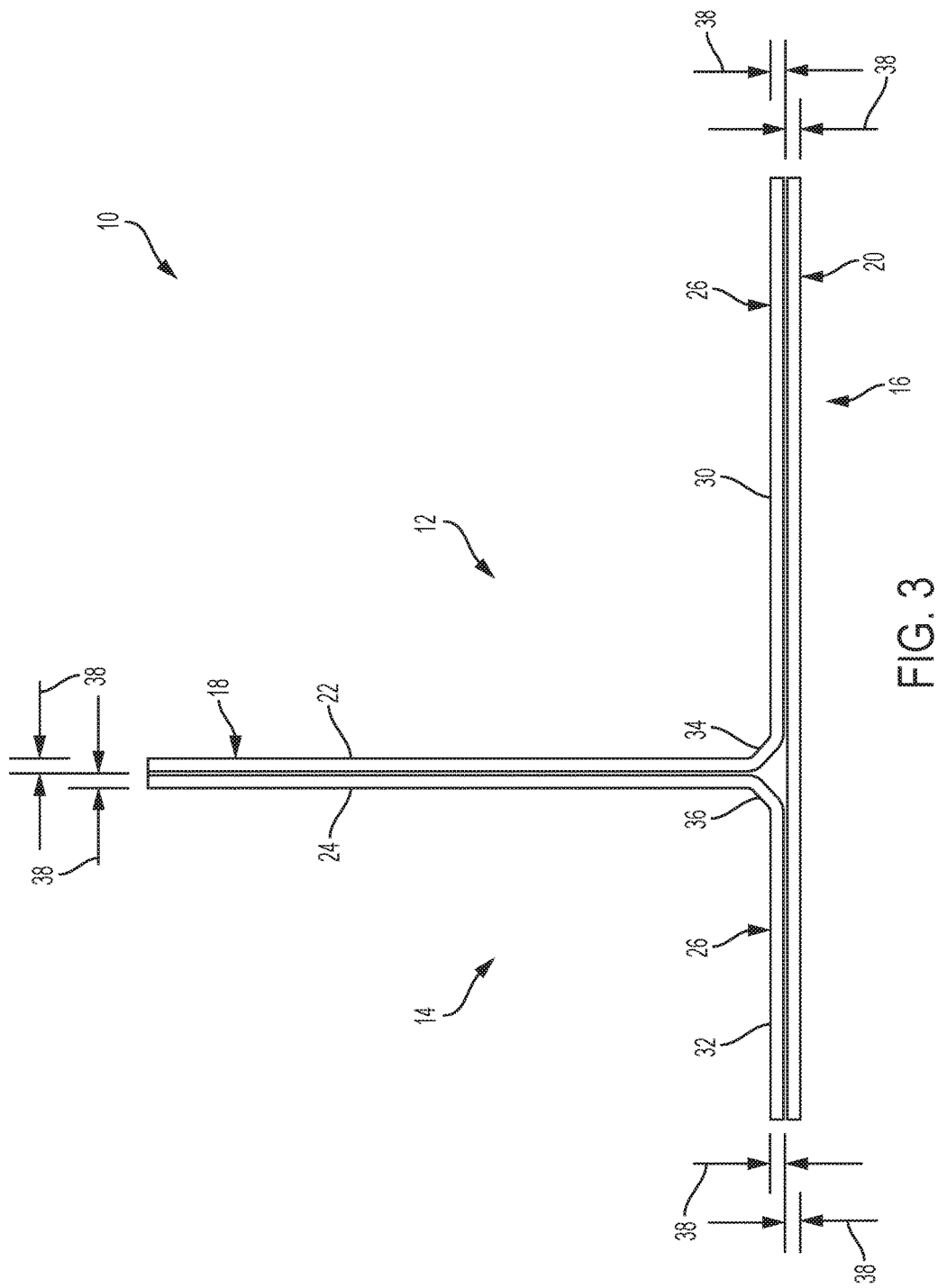
FIG. 3 is a side plan view of the masking device.

Referring now to FIG. 3, the first member 12 is formed as an integral piece and includes a bend 34 (or a fold) disposed between the first portion 22 and the second portion 30. In other words, the first member 12 defines the first portion 22, the second portion 30, and the bend 34 therebetween. Also, the first portion 22 is adjacent to the second portion 30. Similarly, the second member 14 is formed as an integral piece and includes a bend 36 (or a fold) disposed between the first portion 24 and the second portion 32. As such, the second member 14 defines the first portion 24, the second portion 32, and the bend 36 therebetween. The first portion 24 is adjacent to the second portion 32.

As illustrated in FIG. 3, each member 12, 14, 16 has a uniform thickness 38. Accordingly, the base 20 is twice as thick as the thickness 38 since the second portion 30 of the first member 12 and the second portion 32 of the second member 14 are coupled to the third member 16. Also, the pull tab 18 is twice as thick as the thickness 38 since the first portion 22 of the first member 12 is coupled to the first portion 24 of the second member 14.

Figure 4:
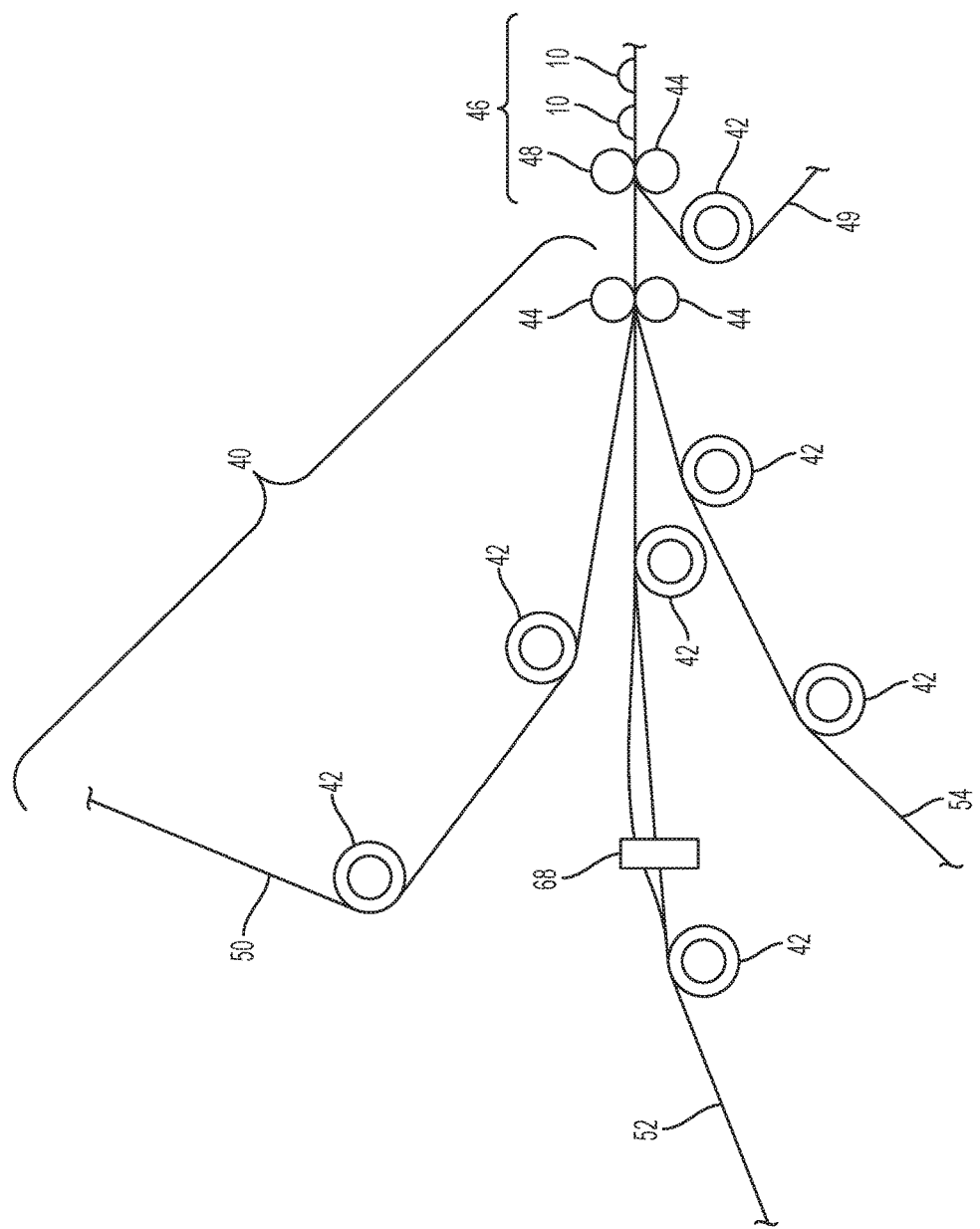
FIG. 4 is a schematic of a manufacturing process utilized to fabricate the masking device.
Figure 7:
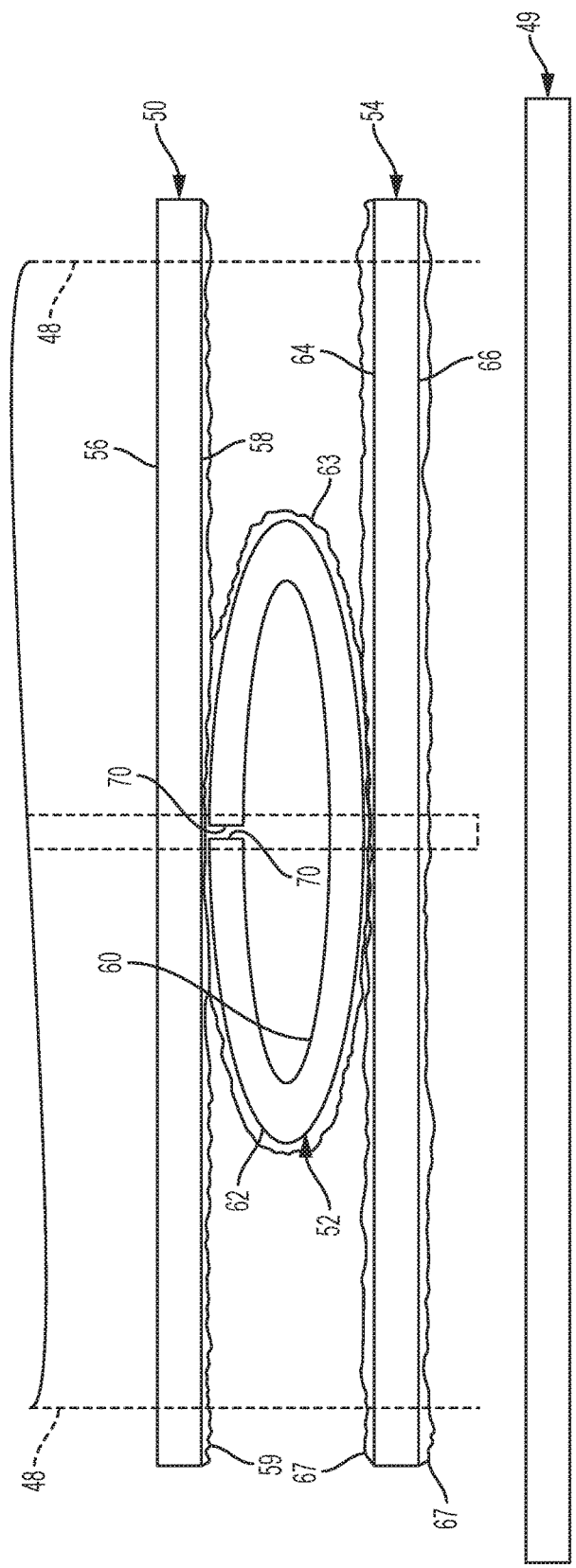
FIG. 7 is another schematic of the manufacturing process utilized to fabricate the masking device.
Figure 8:
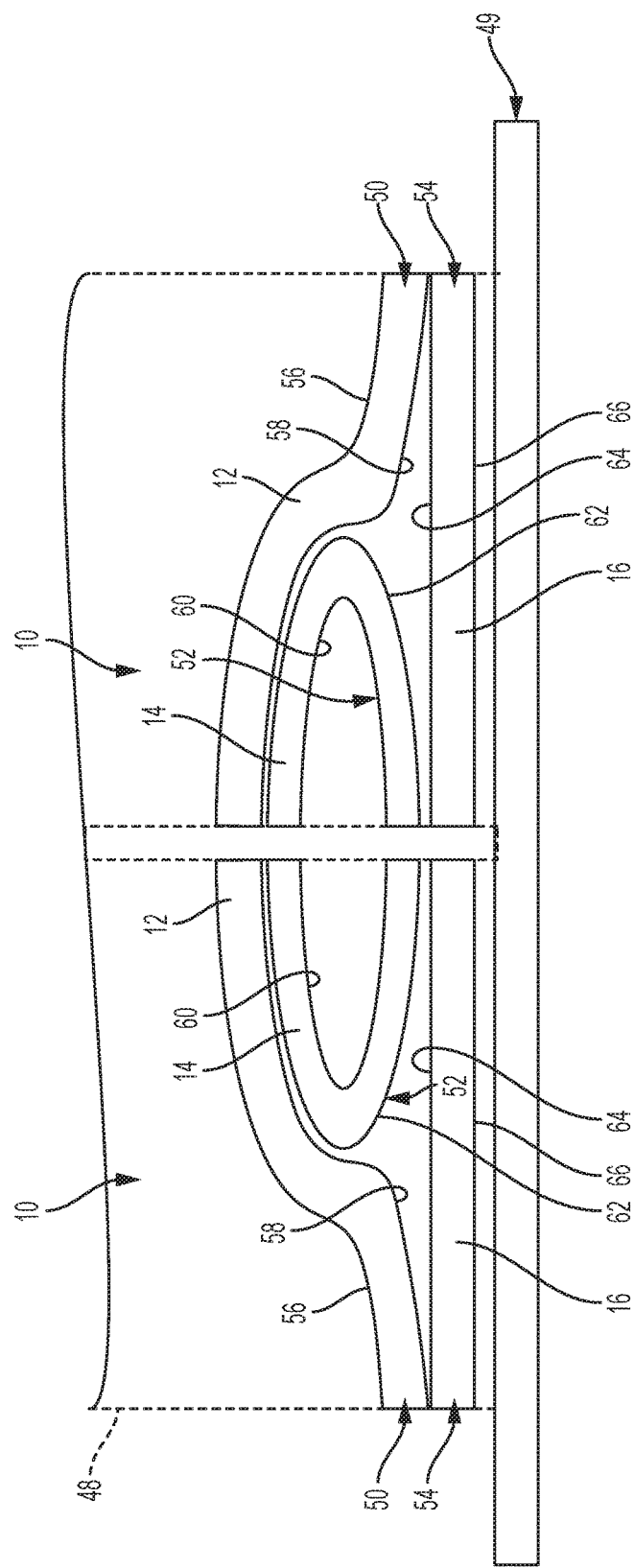
FIG. 8 is another schematic of the manufacturing process utilized to fabricate the masking device.
Figure 9:
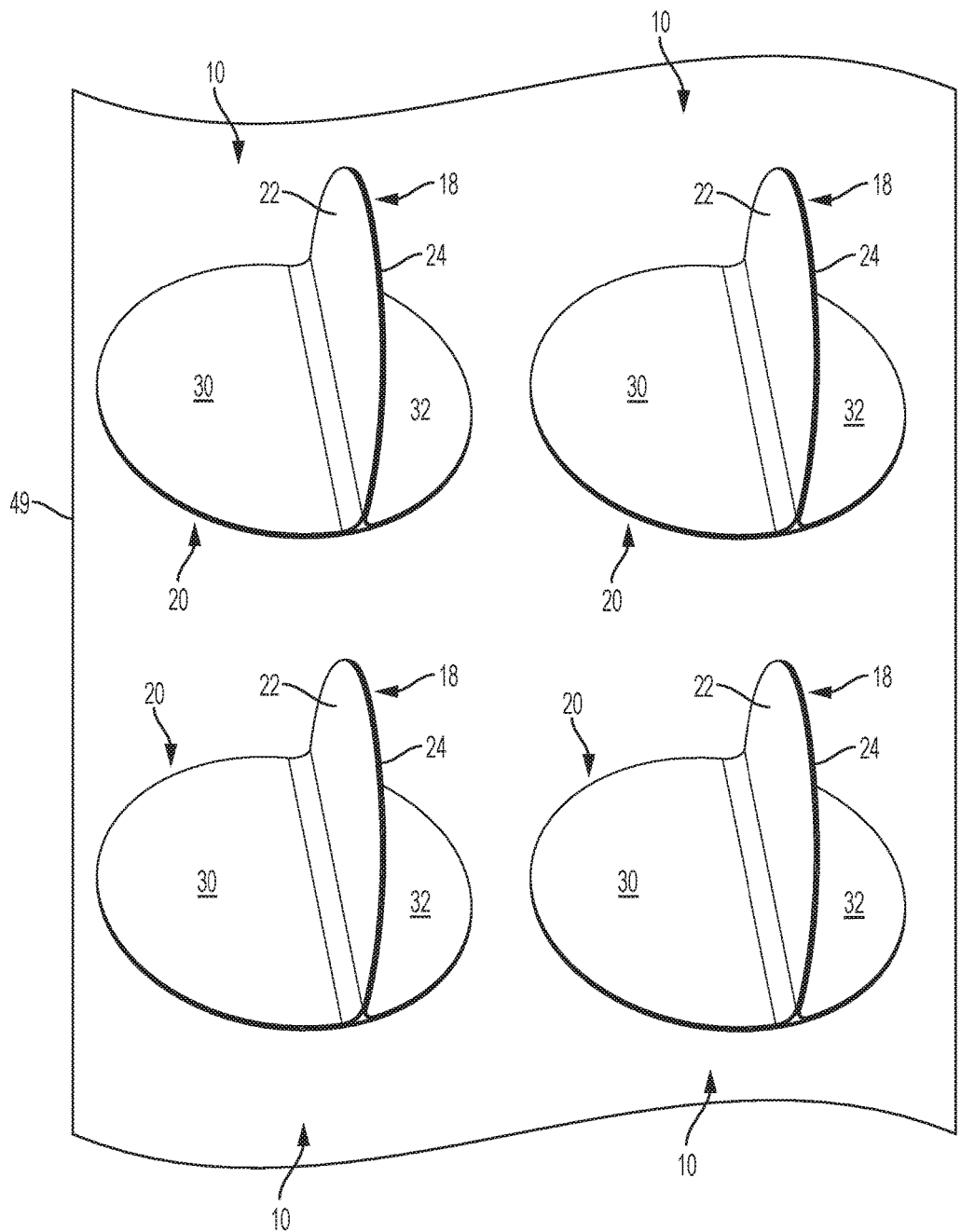
FIG. 9 is a perspective view of a plurality of masking devices.

With reference to FIGS. 4-9, the masking device 10 is fabricated in two manufacturing stages 40, 46, as described in more detail below. In the first manufacturing stage 40, the three members 12, 14, 16 are coupled (or merged) together by using a series of guide rollers 42 and press rollers 44 (FIG. 4). In the second manufacturing stage 46, the masking device 10 is formed with a rotary die 48 by cutting each member 12, 14, 16 to form the circular-shape of the masking device 10. Once the masking device 10 passes the rotary die 48, multiple masking devices 10 are applied to a release liner 49 (e.g., a polymer liner), as shown in FIGS. 4 and 8. The release liner 49 has a coating that allows the masking devices 10 to be easily removed for attachment to the masking area. Also, the masking device 10 can be removed from the masking area without the masking device 10 uncoupling and without leaving a residue on the masking area. The release liner 49 provides an easy way to package the masking devices 10 for sale or use (FIG. 9).

Figure 5:
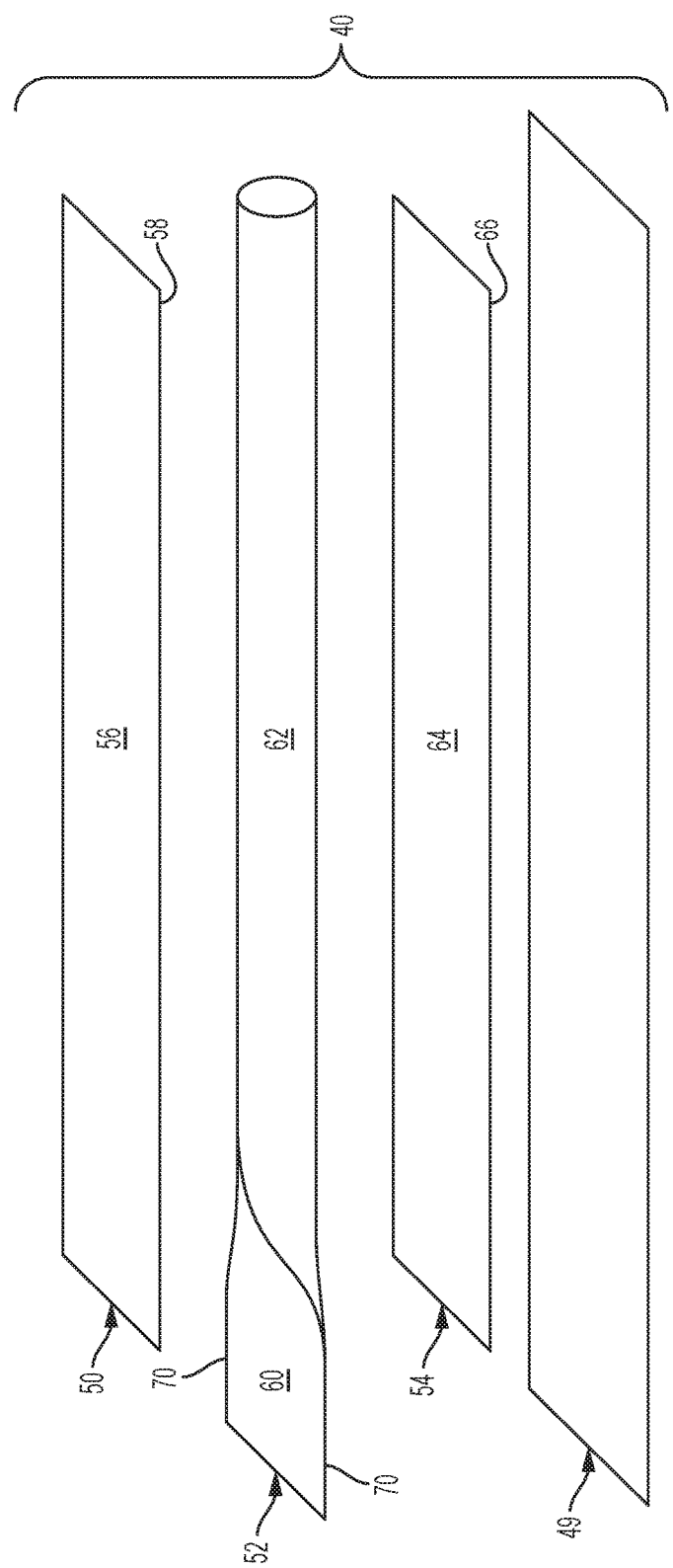
FIG. 5 is another schematic of the manufacturing process utilized to fabricate the masking device.
Figure 6:
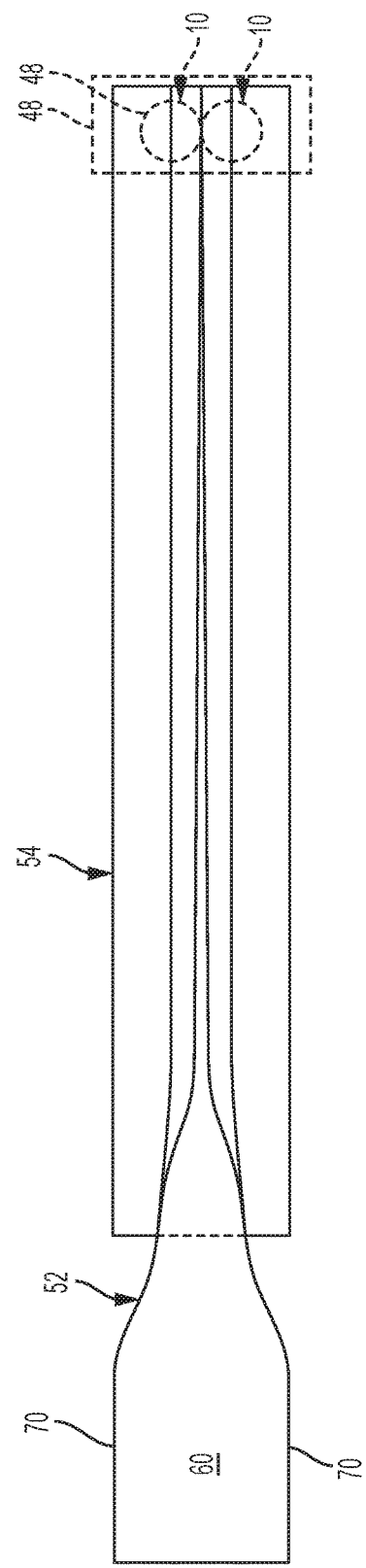
FIG. 6 is another schematic of the manufacturing process utilized to fabricate the masking device.

With reference to FIG. 4-8, the three members 12, 14, 16 are formed from three separate tapes 50, 52, 54. Specifically, the first member 12 is formed from the first tape 50. Also, the second member 14 is formed from the second tape 52. Lastly, the third member 16 is formed from the third tape 52. As illustrated in FIGS. 5 and 7, the first tape 50 has a first face 56 that forms the first portion 22 and the second portion 30 of the first member 12. The first tape 50 also has a second face 58 that couples to the second and third members 14, 16. The second face 58 of the first tape 50 includes an adhesive 59 while the first face 56 does not (FIG. 7). Also, the second tape 52 has a first face 60 that forms the first portion 24 and the second portion 32 of the second member 14. The second tape 52 also has a second face 62 that couples to the first and third members 12, 16. The second face 62 of the second tape 52 includes an adhesive 63 while the first face 60 does not (FIG. 7). Further, the third tape 54 has a first face 64 that couples to the second portions 30, 32 of the first and second members 12, 14. The third tape 54 also has a second face 66 that couples to the release liner 49. The first face 64 and the second face 66 of the third tape 54 include an adhesive 67 (FIG. 7). In the illustrated embodiment (i.e., the masking device 10 composed of polyester), the adhesives 59, 63, 67 of each tape 50, 52, 54 is a silicone base adhesive having a peel adhesion of approximately 25-40 ounces per inch and having a thickness of approximately 0.5 to 2.5 millimeters. Specifically, the adhesives 59, 63, 67 have a peel adhesion of 35 ounces per inch and have a thickness of approximately 1.5 millimeters. In some embodiments, the adhesives 59, 63 of the tapes 50, 52 is more aggressive (i.e., stronger, thicker, greater peel adhesion, etc.) than the adhesive 67 of the tape 54 to permit removal of the masking device 10 from the masking area and release liner 49 while inhibiting the members 12, 14, 16 from uncoupling during such removal. Also, in some embodiments, the adhesives 59, 63, 67 could alternatively be a resin-based adhesive, an acrylic-based adhesive, a rubber-based adhesive, a silicone-based adhesive, or other similar types of adhesives.

In the first manufacturing stage 40, the three tapes 50, 52, 54 are conveyed along an assembly line, such as guide rollers 42, and eventually converge to contact each other via press rollers 44. Prior to converging, the second tape 52 is curled via a curling elements 68 (FIG. 4) such that lateral edges 70 (FIGS. 5 and 6) are urged toward each other and contact each other. As a result, the second tape 52 becomes tubular shaped. However, one of the guide rollers 42 flattens the tubular shape of second tape 52 (FIG. 4) prior to passing through the press rollers 44. Thus, the adhesive 63 on second face 62 of the second tape 52 faces outwardly toward both the first and third tape 50, 54, as shown in FIGS. 5 and 7. When the tapes 50, 52, 54 converge, the adhesive 59 on the second face 58 of the first tape 50 couples to the adhesive 63 on the second face 62 of the second tape 52. Also, the adhesive 67 on the first face 64 of the third tape 54 couples to both the adhesive 59 on the second face 58 of the first tape 50 and the adhesive 63 on the second face 62 of the second tape 52. Lastly, the adhesive 67 on the second face 66 of the third tape 54 couples to the release liner 49.

In the second manufacturing stage 46, the rotary die 48 cuts through the three tapes 50, 52, 54 in a circular pattern (FIG. 6), thereby creating the circular-shape of the masking device 10. The rotary die 48 only cuts deep enough to cut through the three tapes 50, 52, 54 while leaving the release liner 49 uncut, as shown in FIGS. 8 and 9.

In operation, the pull tab 18 is used to ease the application and the removal of the masking device 10 from the masking area. The masking device 10 is simply applied to the desired masking area by gripping the pull tab 18, removing the masking device 10 from the release liner 49, and applying it to the masking area. After the masking area has been coated, the masking device 10 is removed from the masking area by pulling upwardly on the pull tab 18.

Thus, the invention provides, among other things, a masking device for covering a masking area.

What is claimed is:

1. A method of manufacturing a masking device used for covering a masking area, the method comprising:
   conveying a first tape along an assembly line toward a press roller;
   conveying a second tape along the assembly line toward the press roller;
   conveying a third tape along the assembly line toward the press roller;
   curling lateral edges of the second tape toward each other such that the second tape is tubular-shaped;
   converging the first tape, the second tape, and the third tape through the press roller to couple the first tape, the second tape, and the third tape together;
   cutting through the first tape, the second tape, and the third tape via a die cutter to cut out the masking device; and
   applying the masking device to a release liner in a manner that the masking device is removable from the release liner.

2. The method of claim 1, further including providing the first tape without an adhesive on a first face and providing a second face with the adhesive, and providing the second tape without the adhesive on a first face and providing a second face with the adhesive, and providing the third tape with the adhesive on a first face and the adhesive on a second face.

3. The method of claim 2, further including coupling the second face of the first tape to the second face of the second tape, and coupling the first face of the third tape to the second face of the first tape and the second face of the second tape.

4. The method of claim 2, further including providing the adhesive as a silicone based adhesive.

5. The method of claim 2, further including providing the silicone based adhesive with a peel adhesion of 25 to 40 ounces per inch.

6. The method of claim 1, further including providing the die cutter as a rotary die cutter.

\* \* \* \* \*